July 10, 1934.  G. A. PAGE, JR., ET AL  1,966,043
COWLING RING
Filed Jan. 16, 1931
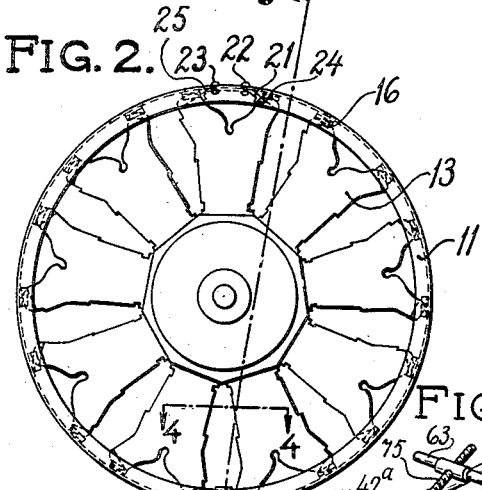
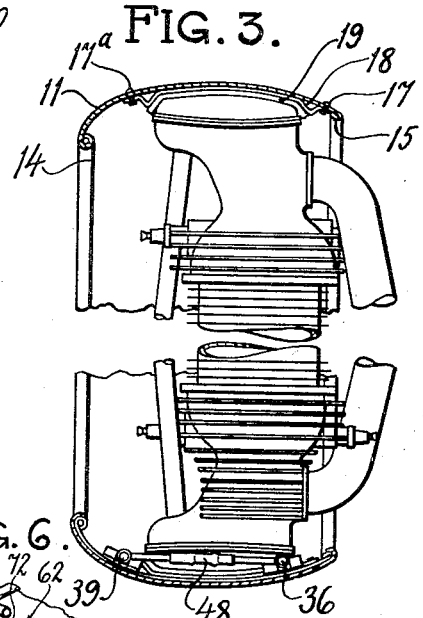
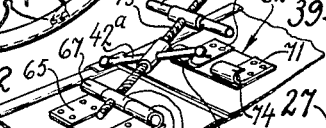
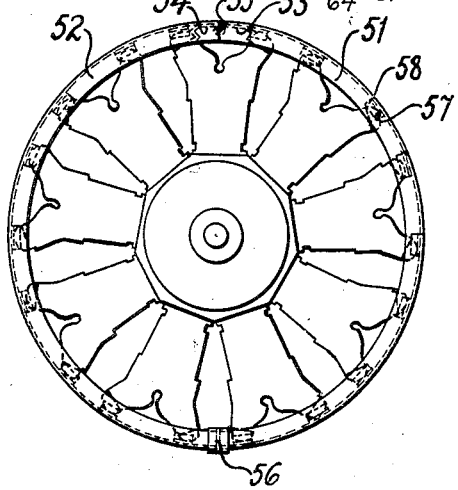
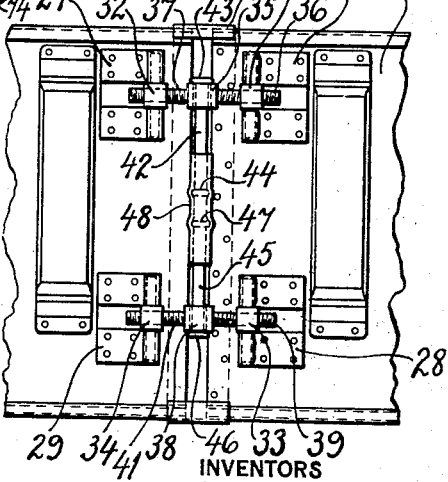
INVENTORS
GEORGE A. PAGE JR.
AND GEORGE E. WARREN
BY
ATTORNEY Patented July 10, 1934

UNITED STATES PATENT OFFICE 1,966,043

COWLING RING

George A. Page, Jr., Freeport, and George E. Warren, Flushing, N. Y., assignors to Curtiss Aeroplane & Motor Company, Inc., a corporation of New York Application January 16, 1931, Serial No. 509,122

15 Claims. (Cl. 244—31)

This invention relates to aircraft and more particularly to a novel and improved cowling which is especially fitted for use with aircraft air cooled motors.

Prior to our invention cowlings have sometimes been provided for air cooled engines in order to improve the air flow around the sides of said engines. The National Advisory Committee for Aeronautics has developed a type of cowling known as the N.A.C.A. cowling and there has also been developed a variation of this N.A.C.A. cowling known as the Townend ring. These developments are particularly valuable in improving the air flow around the motors and around the front of the fuselage of aircraft. They tend to reduce the drag of the fuselage and the air cooled engine mounted thereon so that much greater speeds are possible with the same expenditure of power. However, prior to our invention such cowlings and rings have always (so far as applicants know) been secured by bolting or riveting to the engine or to the fuselage. This construction makes it inconvenient and difficult to reach the various parts of the engine in order to accomplish repairs and adjustments which may from time to time become necessary.

One of the objects of our invention is to provide a cowling for an aircraft engine which is especially easy to remove from the engine for purposes above mentioned.

A further object of the invention is to provide an easily removable cowling of the above stated character which is nevertheless firmly secured to the engine so that there will be no possibility of the cowling being lost in flight.

Further objects of the invention will be apparent from a reading of the subjoined specification and claims and from a consideration of the accompanying drawing.

In order to explain the invention more clearly, several embodiments thereof are shown in said drawing, in which:

Fig. 1 is an elevation of an airplane equipped with a ring constructed according to our invention;

Fig. 2 is a front elevation of the motor and cowling ring of the airplane shown in Fig. 1 but drawn on an enlarged scale and shown with the propeller, the wings, control surfaces, and the landing gear removed;

Fig. 3 is an enlarged section taken on the line 3—3 of Fig. 2 showing further details of the improved cowling;

Fig. 4 is a still further enlarged section showing details of the lock for the cowling;

Fig. 5 is a view similar to Fig. 2 showing a modified form of cowling also constructed according to our invention; and Fig. 6 is a view in perspective of a modified form of lock adapted to be used with our invention.

Referring particularly to the drawing, we have shown an airplane 10 which is equipped with a cowling ring 11. This cowling, which may be seen most clearly in Figs. 2 and 3, is formed of a one-piece metal strip. It has a smooth outer surface which, as may be seen in Fig. 3, is curved somewhat so that the outer surface thereof is streamline in form.

Provision is made so that the ring may be easily assembled and removed from the engine. The ring 11 is a one-piece strip but is split as at 12 and is formed of a metal which has some degree of resiliency so that the ends adjacent to 12 may be sprung apart and the ring placed over the engine in assembly or removed from its normal assembled position surrounding the engine 13. The front of the ring 11 is preferably rolled as at 14 and the rear is preferably rolled as at 15 in order that the wind resistance of the ring 11 may be reduced to a minimum, and in order to strengthen the ring.

Means are provided to insure that the ring shall bear firmly on the engine so that it may be supported thereby and cannot when in assembled position be moved forward or backward relative to the engine. It may be noted that the rocker boxes 16 of the engine 13 are adapted to approach the ring 11 at various points around the circumference of the ring. Brackets 18 (see Fig. 3) are attached to the ring 11 at suitably spaced points adjacent to said rocker boxes by means of bolts such as 17 and 17ª. Each of these brackets carries a felt pad such as the pad 19, all of which pads are adapted to contact with and bear upon the associated rocker boxes of the engine 13. While felt pads give good service, asbestos pads may be substituted if desired. It is to be noted that the brackets 18 are somewhat similar to a W in shape while the pads are of a U shape. Thus a series of firm fastenings are provided which effectually prevent forward and rearward movement of the ring.

Means are also provided to prevent the ring from rotating relative to the engine when in assembled position. Intermediate one or more pair of the rocker boxes there is provided a special stop bracket 21 which is also secured to the ring 11 by means of rivets such as the rivets 22 and 23 or in any other suitable manner. The stop bracket 21 is somewhat of an inverted U in shape and carries pads similar to the pads 19 adapted to contact with the associated rocker boxes as at 24 and 25 in order to maintain the ring in one certain position with reference to the engine 13.

The two ends of the ring at the point of separation 12 are normally secured to each other by a lock which is shown most clearly in Fig. 4.

Riveted or secured in any other suitable manner to the ends of the ring 11 are angle plates 26, 27, 28 and 29. These plates are formed with lugs 31, 32, 33 and 34, respectively, each having a threaded opening adapted to receive a bolt. Associated with the lugs 31 and 32 is a block 35 adapted to receive the heads of bolts 36 and 37 which are formed with left-hand and right-hand threads, respectively, and which are adapted to be threaded into the lugs 31 and 32, respectively. The heads of the bolts 36 and 37 are so secured within the block 35 that they turn integrally with the block 35. Thus it may be seen that when the block 35 and the bolts 36 and 37 are turned in a clockwise direction as seen in Fig. 3 the lugs 31 and 32 and consequently the ends of the ring 11 will be drawn together. Associated with the lugs 33 and 34 is a block 38 corresponding to the block 35 and bolts 39 and 41 corresponding to the bolts 36 and 37 and serving a similar purpose. The blocks 35 and 38 are also formed with circular holes arranged substantially perpendicular to the bolts 36 and 37 and 39 and 41. Passing through the hole in the block 35 is a pin 42 formed with enlarged heads 43 and 44 at the opposite ends thereof. A similar pin 45 passes through the hole in the block 38 and is formed with enlarged heads 46 and 47. These pins serve to form levers by which the bolts may be turned to be threaded into the lugs 31, 32, 33 and 34 and also serve after the bolts have been threaded in said lugs and the ends of the ring have been drawn to their tightened position to maintain the bolts in their adjusted position. For the last mentioned purpose a sleeve 48 of rubber or other similar material is also provided and is adapted to receive the enlarged ends 44 and 47 of the pins 42 and 45 and maintain the pins in alignment after installation of the cowling ring. As may be seen in Fig. 4 a narrow strip 49 may be provided and secured to one end of the ring to cover the gap between the ends and reduce air resistance.

In Fig. 5 we have shown a modified form of ring also constructed according to our invention. Therein, instead of the ring being formed of a single strip of metal, it is formed of two strips 51 and 52 connected to each other by a hinge at their upper end and by a clamp at their lower end. The hinge at the upper end is formed by spacer brackets 53 and 54 which also serve the purpose accomplished by the bracket 21 shown in Fig. 2. The brackets 53 and 54 are pivotally united by means of a hinge pin 55. The lower ends of the sections 51 and 52 of the ring are united by a clamp 56 similar to the clamp by which the lower ends of the ring 11 are united.

The brackets 57 carrying the pads 58 instead of being secured to the sections 51 and 52 of the ring are secured to the rocker boxes of the engine and are adapted to contact with the sections 51 and 52 of the ring and with the rolled forward and rearward ends thereof. These contacts prevent the movement of the ring forward or backward and the contact of the brackets 53 and 54 with the adjoining brackets 57 prevent rotative movement of the ring.

In Fig. 6 a modified form of lock is disclosed wherein the lugs 32 and 34 are replaced by a hinged structure shown at 61. The lugs 26 and 28 are replaced by a hooked structure such as that shown at 62 and a bar cooperating with the hooked structure such as the bar or pin 63. The hinged structure 61 comprises a pair of plates 64 and 65 formed with sockets as at 66 and 67 for the reception of a pin 68. The hooked structure 62 comprises a pair of plates 71 and 72 riveted to the opposite end of the cowling ring and formed with curved ends 73 and 74 adapted to receive the bolt 63. The pin 63 and the pin 68 are formed with threaded openings adapted to receive a bolt 75 which performs the functions of the bolts 37 and 41. A handle 42$^a$ is provided adjacent to the center of the bolt 75 for turning the bolt to thread it within the openings and for locking the bolt in its tightened position.

It may be seen that this form of device may be more easily locked and unlocked inasmuch as soon as the bolt 75 is loosened slightly the pin 63 may be slipped out from the hooks 73 and 74, the bolt 75 hinging with the pin 68 in the sockets 66 and 67. Similarly, the device may be assembled without the necessity of removing the bolt 75 entirely from the cooperating threaded openings.

As explained in connection with the first modification described, no brackets need be directly attached to the engine. In fact, we consider this construction to be very much preferable to the construction in which the brackets are attached to the engine. In the preferred construction, upon the release of the lock, the ring may be opened and easily removed from the engine, leaving the engine free of all obstructions and exactly the same as if it were not provided with a cowling ring. Thus, the engine may be easily repaired, while at the same time the cowling ring may be quickly attached and the advantages of the cowling obtained.

It is believed that the operation and method of assembly and disassembly of the devices disclosed in illustration of our invention will be apparent from the above description. When it is desired to place the cowling ring on the motor, the lower ends thereof are moved apart either by springing the metal as in the modification shown in Figs. 1 to 4, inclusive, or by bending at the hinge 53—54—55 of the modification shown in Fig. 5. Thereupon, it is possible to place the separated ends of the ring over the motor. When the separated ends of the ring shown in Figs. 1-4, inclusive, are brought together around the motor, the asbestos pads 19 on the brackets 18 are brought into contact with the rocker boxes of the motor and the bracket 21 is interposed between one pair of rocker boxes. The lower ends of the ring in each case are then drawn firmly together and clamped by means of the bolts 36, 37, 39 and 41. This clamping of the lower ends draws the pads 19 on the brackets 18 and 21 into firm contact with the rocker boxes and the ring is held firmly and securedly in position. When the separated ends of the ring shown in Fig. 5 are brought together around the motor the pads 58 are brought into contact with the ring and the brackets 53 and 54 are interposed between one pair of the pads 58. Thus the ring 51—52 is also firmly held in position.

While we have described the above invention as if applied to the engine of an airplane, it is apparent that a cowling ring might be advantageously used with any body used with aircraft and adapted to pass through the air. For instance, it might be used on the nose of a dirigible airship. It might be advantageously used on the nose of the fuselage of an airplane in which the motor is not mounted in front of the fuselage. For instance, it might be used in connection with the nose of a twin motor ship where the motors are provided on the wings outward from the fuselage.

The above described embodiments of the invention are for the purpose of illustration only, and various changes may be made therein without departing from the spirit and scope of the invention.

We claim as our invention:

1. In aircraft, a motor, a cowling ring, and means secured to said ring and bearing on but not secured to said motor for preventing axial displacement of said ring relative to said motor.

2. In aircraft, a motor, a cowling ring, and means secured to said ring and bearing on but not secured to said motor for preventing circumferential movement of said ring relative to said motor.

3. In aircraft, a cowling ring formed of a resilient strip having its ends adapted to be secured to each other and means for securing said ends to each other comprising a pair of lugs secured to each of the adjacent ends of said strip with each lug having an internally threaded opening formed therein, two pairs of screws associated with said lugs in which one screw of each pair is formed with a right-hand thread and the other screw of each pair is formed with a left-hand thread on the other end thereof, and a handle for each pair of said screws for turning them and thus drawing said lugs and the ends of said strip closer to each other.

4. In aircraft, a motor, outward extending projections forming a part of said motor, a one-piece resilient strip shaped substantially as a ring and surrounding said motor, brackets secured to said strip and extending inward toward the center of said ring, pads secured to said brackets and bearing upon said projections, and a lock for securing the ends of the strip to each other, said lock comprising two pairs of screws each pair having one screw formed with a right-hand thread and having the other screw formed with a left-hand thread, a handle for each pair of said screws, and lugs secured to the strip adjacent to the ends thereof and formed with threaded openings for the reception of said screws.

5. In aircraft, a radial internal combustion engine, rocker boxes formed as a part of said internal combustion engine and projecting outward therefrom, a metallic resilient one-piece strip formed substantially as a ring with the ends thereof adjacent to each other, a plurality of plates bolted to said strip and extending inward therefrom, felt pads secured to said plates and each bearing upon one of said rocker boxes, and means for securing the adjacent ends of said strip to each other to cause said pads to bear firmly upon said rocker boxes and maintain the ring formed by said strip in secure association with said internal combustion engine, said last named means comprising a pair of lugs secured to each of the adjacent ends of said strip with each lug having an internally threaded opening formed therein, two pairs of screws associated with said lugs in which one screw of each pair is formed with a right-hand thread and the other screw of each pair is formed with a left-hand thread, and a handle for each pair of said screws for turning them in said threaded openings and thus drawing said lugs and the ends of said strip closer to each other.

6. In aircraft, a cowling ring comprising a resilient strip, a plurality of brackets, means for securing said brackets to the inner side of said strip, a pair of inward projections formed on each bracket, and a felt pad secured to said bracket intermediate each projection.

7. In aircraft, a cowling ring comprising one or more strips having adjacent ends adapted to be secured to each other, means for securing two of said ends to each other comprising an attachment secured to one end of one strip and formed with an opening therein, a hinged bolt pivoted in the opening in said attachment and having a threaded opening therein, a screw having one end threaded and screwed within the opening in said bolt and having the opposite end thereof threaded in the opposite direction, a second bolt formed with an internally threaded opening through which said opposite end of the screw is threaded, and a pair of hook-shaped plates secured to the opposite end of the strip for the reception of said second named bolt.

8. In a split annular cowling of the type adapted to be disposed without the periphery of the cylinders of a radial aircraft engine, means carried by said cowling and adapted to cooperate with a part of said engine for floatably supporting said cowling on said engine, and means for adjustably clamping said cowling to said engine.

9. In a split annular cowling of the type adapted to be disposed without the periphery of the cylinders of a radial aircraft engine, means carried by said cowling and adapted to cooperate with a part of said engine for floatably supporting said cowling on said engine, and straps fixedly secured to the split portion of said cowling, said straps being adapted to hold trunnions provided with screw means for adjustably clamping said cowling to said engine.

10. In a split annular cowling of the type adapted to be disposed without the periphery of the cylinders of a radial aircraft engine, a plurality of retaining devices carried by said cowling, and paddings disposed within said devices and adapted to be superimposed upon the rocker-box housings of said cylinders for floatably supporting said devices upon said engine.

11. In a split annular cowling of the type adapted to be disposed without the periphery of the cylinders of a radial aircraft engine, a plurality of retaining devices carried by said cowling, paddings disposed within said devices and adapted to be superimposed upon the rocker-box housings of said cylinders for floatably supporting said devices upon said engine, and means for adjustably clamping said cowling to said engine.

12. In a split annular cowling of the type adapted to be disposed without the periphery of the cylinders of a radial aircraft engine, a plurality of retaining devices fixedly secured to said cowling, paddings disposed within said devices and adapted to be superimposed upon the rocker-box housings of said cylinders for floatably supporting said devices upon said engine, and straps fixedly secured to the split portion of said cowling, said straps being adapted to hold trunnions provided with screw means for adjustably clamping said cowling to said engine.

13. In a split annular cowling of the type adapted to be disposed without the periphery of the cylinders of a radial aircraft engine, a plurality of retaining devices fixedly secured to said cowling, paddings disposed within said devices, said paddings being adapted to be superimposed upon the rocker-box housings of said cylinders for floatably supporting said devices upon said engine, and straps fixedly secured to the split portion of said cowling, said straps being adapted to hold trunnions provided with screw means for adjustably clamping said cowling to said engine, said screw means being further provided with locking means.

14. An airplane anti-drag ring for use with radial type engines comprising a split anti-drag ring, a series of projections carried by the head of each cylinder of a radial type engine adapted to be engaged by said ring, and adjacent to the split end of said ring for placing said ring in tension, and by the tension thus exerted, holding said split ring in place on said radial engine.

15. An airplane anti-drag ring for use with radial type engines, comprising a split anti-drag ring, a series of projections on the inner surface of said ring, yielding means carried by at least a part of the projections on the inner surface of said ring adapted to engage projections carried by the head of each cylinder of a radial type engine, and means adjacent to the split end of said ring for placing said ring in tension, and by the tension thus exerted, holding said split ring in place on said radial engine.

GEORGE A. PAGE, Jr.
GEORGE E. WARREN.